US011849007B2

(12) United States Patent
Picard et al.

(10) Patent No.: US 11,849,007 B2
(45) Date of Patent: Dec. 19, 2023

(54) PROVIDING DATA FROM DATA SOURCES (71) Applicant: Hewlett Packard Enterprise Development LP, Houston, TX (US)

(72) Inventors: Jean-Charles Picard, Mougins (FR); Thomas Moreau, Mougins (FR)

(73) Assignee: Hewlett Packard Enterprise Development LP, Spring, TX (US)

(*) Notice: Subject to any disclaimer, the term of this patent is extended or adjusted under 35 U.S.C. 154(b) by 837 days.

(21) Appl. No.: 15/522,791

(22) PCT Filed: Mar. 25, 2015

(86) PCT No.: PCT/US2015/022486
§ 371 (c)(1),
(2) Date: Apr. 28, 2017

(87) PCT Pub. No.: WO2016/069048
PCT Pub. Date: May 6, 2016

(65) Prior Publication Data
US 2017/0324838 A1 Nov. 9, 2017

(30) Foreign Application Priority Data
Oct. 29, 2014 (EP) .................................... 14306728

(51) Int. Cl.
*H04L 67/63* (2022.01)
*G06F 9/54* (2006.01)
(Continued)

(52) U.S. Cl.
CPC ............ *H04L 67/63* (2022.05); *G06F 3/0482* (2013.01); *G06F 9/541* (2013.01); *H04L 67/56* (2022.05)

(58) Field of Classification Search
CPC ........ G06F 3/0482; G06F 9/541; G06F 9/546; G06F 16/248; G06F 16/25; G06F 16/252;
(Continued)

(56) References Cited
U.S. PATENT DOCUMENTS 6,366,916 B1* 4/2002 Baer ..................... G06F 16/252
6,917,939 B1* 7/2005 Baer ..................... G06F 16/252
709/203
(Continued)

FOREIGN PATENT DOCUMENTS

EP          2381629 A1    10/2011
EP          3015984        5/2016
WO     WO-2006026673 A2   3/2006

OTHER PUBLICATIONS

Extended European Search Report received in EP Application No. 14306728.8, dated Apr. 29, 2015, 6 pages.
(Continued)

*Primary Examiner* — Greg C Bengzon
(74) *Attorney, Agent, or Firm* — Hewlett Packard Enterprise Patent Department (57) ABSTRACT Techniques for of providing data from a plurality of data sources are disclosed. A plurality of modules are provided at a common access point. Each module defines data on a respective one of a plurality of data sources, the data including information on data available from the respective data source. In response to a request for data from one of the plurality of data sources at the common access point, data is retrieved from the respective data source using the data on the data source from the respective module. Data is provided from the common access point in dependence on the retrieved data.

21 Claims, 7 Drawing Sheets (51) Int. Cl.
  *G06F 3/0482* (2013.01)
  *H04L 67/56* (2022.01)

(58) Field of Classification Search
  CPC .... G06F 16/254; G06F 16/256; G06F 16/258;
    G06F 16/26; G06F 16/30; G06F 16/338;
    G06F 16/34; G06F 16/438; G06F 16/538;
    G06F 16/81; G06F 16/838; G06F 16/86;
    G06F 16/88; G06F 16/9538; G06F
    16/958; G06F 16/972; G06F 16/986;
    G06F 17/40; H04L 67/28; H04L 67/327
  See application file for complete search history.

(56) References Cited

U.S. PATENT DOCUMENTS

| | | | | |
|---|---|---|---|---|
| 7,392,255 | B1* | 6/2008 | Sholtis | G06F 16/256 |
| 7,606,813 | B1* | 10/2009 | Gritsay | G06F 16/25 |
| 7,702,636 | B1* | 4/2010 | Sholtis | G06F 16/256 |
| | | | | 707/999.1 |
| 7,711,750 | B1 | 5/2010 | Dutta et al. | |
| 7,882,122 | B2 | 2/2011 | Wong | |
| 8,214,409 | B2* | 7/2012 | O'Farrell | G06F 16/25 |
| | | | | 707/802 |
| 8,224,873 | B1 | 7/2012 | Korablev et al. | |
| 8,301,720 | B1 | 10/2012 | Thakker et al. | |
| 8,560,366 | B2 | 10/2013 | Mikurak | |
| 8,566,732 | B2 | 10/2013 | Louch et al. | |
| 8,745,096 | B1* | 6/2014 | Noble | G06F 16/258 |
| | | | | 707/811 |
| 8,838,636 | B2* | 9/2014 | Kulkarni | G06F 16/248 |
| | | | | 707/759 |
| 8,965,987 | B2 | 2/2015 | Lehmann et al. | |
| 9,075,788 | B1* | 7/2015 | Roth | G06F 11/3006 |
| 10,275,475 | B2* | 4/2019 | Tsirogiannis | G06F 16/211 |
| 10,599,642 | B1 | 3/2020 | Hawes et al. | |
| 2002/0035593 | A1* | 3/2002 | Salim | G06Q 10/10 |
| | | | | 709/202 |
| 2002/0091702 | A1* | 7/2002 | Mullins | G06F 16/25 |
| 2002/0116453 | A1* | 8/2002 | Todorov | H04L 41/0226 |
| | | | | 709/203 |
| 2002/0175955 | A1* | 11/2002 | Gourdol | G06F 3/0482 |
| | | | | 715/821 |
| 2003/0061207 | A1 | 3/2003 | Spektor | |
| 2003/0097485 | A1 | 5/2003 | Horvitz et al. | |
| 2003/0110167 | A1 | 6/2003 | Kim | |
| 2003/0226102 | A1* | 12/2003 | Allor | G06F 16/958 |
| | | | | 715/205 |
| 2004/0068728 | A1* | 4/2004 | Blevins | G06F 9/546 |
| | | | | 718/100 |
| 2004/0122977 | A1 | 6/2004 | Moran et al. | |
| 2004/0205452 | A1* | 10/2004 | Fitzsimons | G06F 16/958 |
| | | | | 715/255 |
| 2005/0071803 | A1* | 3/2005 | Cherdron | G06F 8/20 |
| | | | | 717/107 |
| 2005/0108206 | A1* | 5/2005 | Lam | G06F 16/256 |
| 2005/0114487 | A1 | 5/2005 | Peng et al. | |
| 2005/0198561 | A1* | 9/2005 | McAuley | G06F 16/958 |
| | | | | 715/205 |
| 2005/0273758 | A1* | 12/2005 | Long | G06F 8/20 |
| | | | | 717/174 |
| 2006/0010394 | A1* | 1/2006 | Chaudhri | B60K 35/00 |
| | | | | 715/779 |
| 2006/0069803 | A1* | 3/2006 | Clark | G06F 16/25 |
| | | | | 709/237 |
| 2006/0080160 | A1* | 4/2006 | Orumchian | G06F 16/90335 |
| | | | | 705/7.31 |
| 2006/0112188 | A1* | 5/2006 | Albanese | G06F 21/33 |
| | | | | 709/238 |
| 2006/0212846 | A1 | 9/2006 | O'Farrell et al. | |
| 2006/0248121 | A1* | 11/2006 | Cacenco | G06F 8/71 |
| 2006/0265385 | A1* | 11/2006 | Agrawal | G06F 16/256 |
| 2006/0265397 | A1* | 11/2006 | Bryan | G06N 5/02 |
| 2007/0061371 | A1* | 3/2007 | Bodin | G06F 16/4393 |
| 2007/0094256 | A1* | 4/2007 | Hite | G06F 17/2785 |
| 2007/0192348 | A1 | 8/2007 | Brodersen et al. | |
| 2007/0209006 | A1* | 9/2007 | Arthurs | G06F 16/958 |
| | | | | 715/733 |
| 2007/0214454 | A1* | 9/2007 | Edwards | G06F 16/957 |
| | | | | 717/176 |
| 2007/0294307 | A1 | 12/2007 | Chen et al. | |
| 2008/0010253 | A1 | 1/2008 | Sidhu et al. | |
| 2008/0071796 | A1* | 3/2008 | Ghuneim | G06F 16/9038 |
| 2008/0104080 | A1* | 5/2008 | Copeland | G06F 16/25 |
| 2008/0114770 | A1* | 5/2008 | Chen | G06F 16/256 |
| 2008/0155555 | A1* | 6/2008 | Kwong | G06F 9/449 |
| | | | | 719/315 |
| 2008/0163078 | A1 | 7/2008 | Van Der Sanden et al. | |
| 2008/0228521 | A1* | 9/2008 | Wilmering | G06Q 10/00 |
| | | | | 705/2 |
| 2008/0229274 | A1* | 9/2008 | Cacenco | G06F 8/10 |
| | | | | 717/100 |
| 2008/0294712 | A1* | 11/2008 | Lu | H04L 67/16 |
| | | | | 709/202 |
| 2008/0294854 | A1 | 11/2008 | Schneider et al. | |
| 2008/0295074 | A1 | 11/2008 | Schneider et al. | |
| 2009/0037391 | A1 | 2/2009 | Agrawal et al. | |
| 2009/0063573 | A1* | 3/2009 | Takemoto | G06F 8/60 |
| 2009/0119672 | A1* | 5/2009 | Bussard | G06F 9/468 |
| | | | | 718/104 |
| 2009/0282369 | A1* | 11/2009 | Jones | G06F 16/904 |
| | | | | 715/848 |
| 2009/0282423 | A1* | 11/2009 | Smith | G06F 16/972 |
| | | | | 719/328 |
| 2009/0287772 | A1* | 11/2009 | Stone | G06F 9/547 |
| | | | | 709/203 |
| 2009/0319548 | A1* | 12/2009 | Brown | G06F 16/256 |
| 2010/0005168 | A1* | 1/2010 | Williams | G06T 11/60 |
| | | | | 709/224 |
| 2010/0023874 | A1 | 1/2010 | Frohwein | |
| 2010/0138295 | A1 | 6/2010 | Caron et al. | |
| 2010/0169351 | A1* | 7/2010 | Kulkarni | G06F 16/9554 |
| | | | | 707/759 |
| 2010/0325217 | A1 | 12/2010 | Mody et al. | |
| 2011/0041144 | A1* | 2/2011 | Araki | G06F 9/541 |
| | | | | 719/328 |
| 2011/0099487 | A1 | 4/2011 | Pyhalammi et al. | |
| 2011/0125854 | A1* | 5/2011 | Macken | H04L 67/34 |
| | | | | 709/206 |
| 2011/0126134 | A1* | 5/2011 | Macken | H04L 67/02 |
| | | | | 715/760 |
| 2011/0131504 | A1* | 6/2011 | Shustef | G06F 16/958 |
| | | | | 715/745 |
| 2011/0154226 | A1* | 6/2011 | Guertler | G06F 9/541 |
| | | | | 719/328 |
| 2012/0030573 | A1* | 2/2012 | Balko | G06F 8/34 |
| | | | | 715/735 |
| 2012/0059840 | A1* | 3/2012 | Reddy | G06F 16/211 |
| | | | | 707/763 |
| 2012/0124024 | A1* | 5/2012 | Vaughan | G06F 16/972 |
| | | | | 707/706 |
| 2012/0239639 | A1* | 9/2012 | Shriber | G06F 16/248 |
| | | | | 707/711 |
| 2012/0310899 | A1* | 12/2012 | Wasserman | G06F 16/252 |
| | | | | 707/687 |
| 2012/0323933 | A1 | 12/2012 | He et al. | |
| 2012/0330929 | A1* | 12/2012 | Kowalski | G06F 16/26 |
| | | | | 707/722 |
| 2013/0019195 | A1* | 1/2013 | Gates | G06F 3/048 |
| | | | | 715/771 |
| 2013/0145361 | A1* | 6/2013 | Kaegi | H04L 67/10 |
| | | | | 717/176 |
| 2013/0187926 | A1* | 7/2013 | Silverstein | G06Q 10/105 |
| | | | | 345/440 |
| 2013/0191526 | A1* | 7/2013 | Zhao | G06F 9/541 |
| | | | | 709/223 |
| 2013/0268520 | A1* | 10/2013 | Fisher | G06F 16/248 |
| | | | | 707/723 |
| 2014/0089786 | A1* | 3/2014 | Hashmi | G06F 17/2247 |
| | | | | 715/234 |
| 2014/0157351 | A1 | 6/2014 | Canning et al. | |

(56) References Cited

U.S. PATENT DOCUMENTS

| | | | |
|---|---|---|---|
| 2014/0172885 A1* | 6/2014 | Sekharan | G06F 16/254 707/755 |
| 2014/0214967 A1 | 7/2014 | Baba et al. | |
| 2014/0244766 A1* | 8/2014 | Mo | G06F 9/541 709/206 |
| 2014/0279834 A1* | 9/2014 | Tsirogiannis | G06F 16/211 707/602 |
| 2014/0280043 A1* | 9/2014 | Griffin | G06F 16/3322 707/722 |
| 2014/0282453 A1 | 9/2014 | O'Rourke et al. | |
| 2015/0026356 A1 | 1/2015 | Kaplinger et al. | |
| 2015/0058314 A1* | 2/2015 | Leclerc | H04L 63/0815 707/711 |
| 2015/0058868 A1* | 2/2015 | Padinjarel | G06F 9/541 719/316 |
| 2015/0169757 A1* | 6/2015 | Kalantzis | G06F 16/213 707/722 |
| 2015/0199239 A1* | 7/2015 | Prahlad | G06F 11/1451 707/654 |
| 2015/0212989 A1* | 7/2015 | Rice | G06F 16/986 715/234 |
| 2015/0213723 A1* | 7/2015 | Vattikonda | H04L 67/02 434/322 |
| 2015/0242528 A1* | 8/2015 | Buehler | G06F 16/986 707/736 |
| 2015/0347542 A1* | 12/2015 | Sullivan | G06F 16/254 707/602 |
| 2016/0063060 A1* | 3/2016 | Nguyen | G06F 16/2455 707/770 |
| 2016/0086241 A1 | 3/2016 | Proulx | |
| 2016/0094612 A1* | 3/2016 | Lockhart | G06F 16/986 709/217 |
| 2016/0098449 A1* | 4/2016 | Park | G06F 16/24542 707/718 |
| 2016/0103559 A1* | 4/2016 | Maheshwari | G06F 16/248 715/738 |
| 2016/0103750 A1 | 4/2016 | Cooper et al. | |
| 2016/0103888 A1* | 4/2016 | Fletcher | H04L 41/5009 707/722 |
| 2016/0103908 A1* | 4/2016 | Fletcher | G06F 16/334 707/722 |
| 2016/0105338 A1* | 4/2016 | Fletcher | H04L 43/16 709/224 |
| 2016/0110443 A1* | 4/2016 | Slovacek | G06F 16/285 707/737 |
| 2016/0164949 A1* | 6/2016 | Grimstrup | H04L 67/04 709/203 |
| 2016/0366036 A1* | 12/2016 | Gupta | H04L 67/16 |
| 2017/0006119 A1* | 1/2017 | Pogrebinsky | G06F 3/0482 |
| 2017/0046127 A1* | 2/2017 | Fletcher | G06F 3/04817 |
| 2017/0046374 A1* | 2/2017 | Fletcher | G06F 3/0484 |
| 2017/0083165 A1 | 3/2017 | Ali et al. | |
| 2017/0147310 A1 | 5/2017 | Bregler et al. | |
| 2017/0199989 A1* | 7/2017 | Lilko | G06F 16/254 |
| 2017/0220611 A1* | 8/2017 | Yang | G06F 11/366 |
| 2018/0109936 A1 | 4/2018 | Ting et al. | |
| 2018/0189370 A1 | 7/2018 | Bendel et al. | |
| 2020/0379781 A1 | 12/2020 | Rachapudi et al. | |

OTHER PUBLICATIONS

International Search Report & Written Opinion received in PCT Application No. PCT/US2015/022486, dated Jul. 28, 2015, 11 pages.

Kovachev, D. et al., "Direwolf—Distributing and Migrating User Interfaces for Widget-based Web Applications," (Research Paper), Proceedings of Springer Berlin Heidelberg Jul. 8-12, 2013 pp. 99-113 vol. 7977.

Walsh, T. et al., "Collection Manager: Integrating Diverse Data Sources on The Grid", MCNC Research and Development Institute, 2004, 10 pages.

Extended European Search Report, EP Application No. 17199493.2, dated Apr. 4, 2018, pp. 1-9, EPO.

Symantec Corporation, "E-Security Begins with Sound Security Policies," Jun. 14, 2001, pp. 1-23.

Knex.Js, "A SQL Query Builder for Javascript", available online at <https://web.archive.org/web/20190820201744/https://knexjs.org/>, Aug. 20, 2019, 60 pages.

* cited by examiner

PROVIDING DATA FROM DATA SOURCES

BACKGROUND

Reporting and other forms of data provision from computer systems is a common feature. One way of providing data from a computer system is via a user interfaces such as Graphical User Interfaces (GUIs). GUIs have become an accepted way of interacting with computer systems and it is common for a computer system that may be interacted with and may provide data to include a GUI.

BRIEF DESCRIPTION OF THE DRAWINGS

The accompanying drawings illustrate various examples and are a part of the specification. The illustrated examples are examples and do not limit the scope of the claims. Throughout the drawings, identical reference numbers designate similar, but not necessarily identical elements.

DETAILED DESCRIPTION

Increased flexibility can be achieved if a common framework provides access to multiple data sources. Such a capability for defining a modular architecture in which modules can be added or removed from the framework to extend or change the accessible data sources forms the foundation of the present disclosure.

Figure 1:
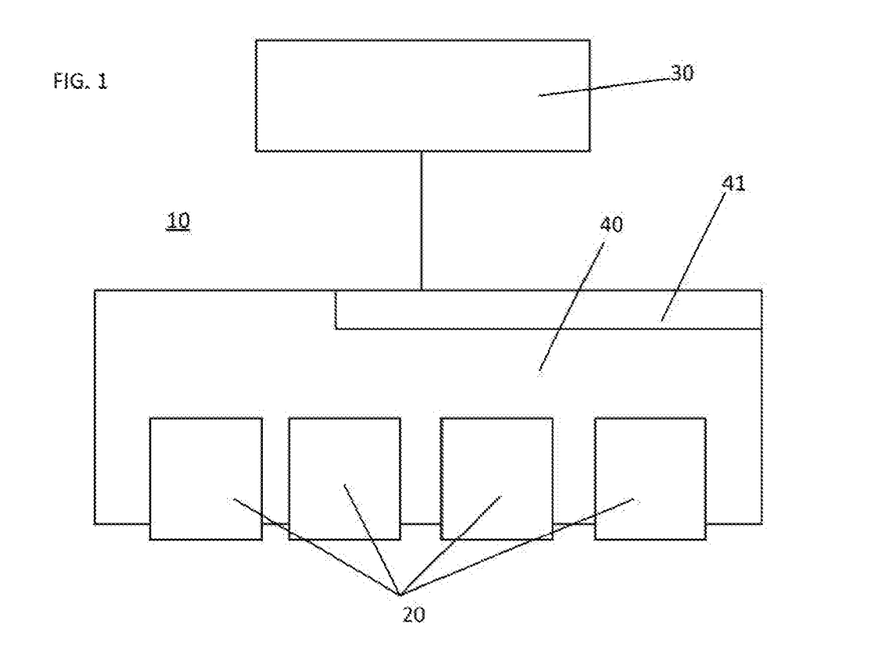
FIG. 1 is a block diagram of an example system to serve data from a plurality of data sources to a client computing device which may make use of the present disclosure.

Providing access to a data source is a common requirement even in small computing devices and systems. Data sources may include event logs in PCs and servers, consumable usage data of printers etc. In larger or Enterprise size computing systems, most systems are likely to be, or form part of, a data source of some description. For example, an enterprise may include Quality of Service (QoS) and other monitoring systems that produce data that can be accessed. It may include management systems, accounting systems, control systems; messaging systems, firewall and security systems and other event management systems that may also be or include data sources. Measurement systems such as probes or networks of probes are also examples of possible data sources. FIG. 1 is a block diagram of an example system to serve data from a plurality of data sources to a client computing device which may make use of the present disclosure.

FIG. 1 includes particular components, modules, etc. according to various examples. However, in different examples, more, fewer, and/or other components, modules, arrangements of components/modules, etc. may be used according to the teachings described herein. In addition, various components, modules, etc. described herein may be implemented as one or more electronic circuits, software modules, hardware modules, special purpose hardware (e.g., application specific hardware, application specific integrated circuits (ASICs), embedded controllers hardwired circuitry, Field Programmable Gate Arrays (FPGA), etc.), or some combination of these.

As shown in FIG. 1, in one example, the system 10 includes a plurality of plugins 20, each plugin 20 being associated with remote data source and encoding computer program code to access the remote data source. In one example, at least one processor 30 executes computer program code to provide an intermediate framework 40 to receive and execute the plurality of plugins, to access each remote data source and to obtain information on data available from each remote data source.

In one example, the system further comprises an interface 41 to receive requests on said information and to retrieve data corresponding to the request by accessing the remote data source corresponding to the information using the associated plugin 20.

Figure 2:
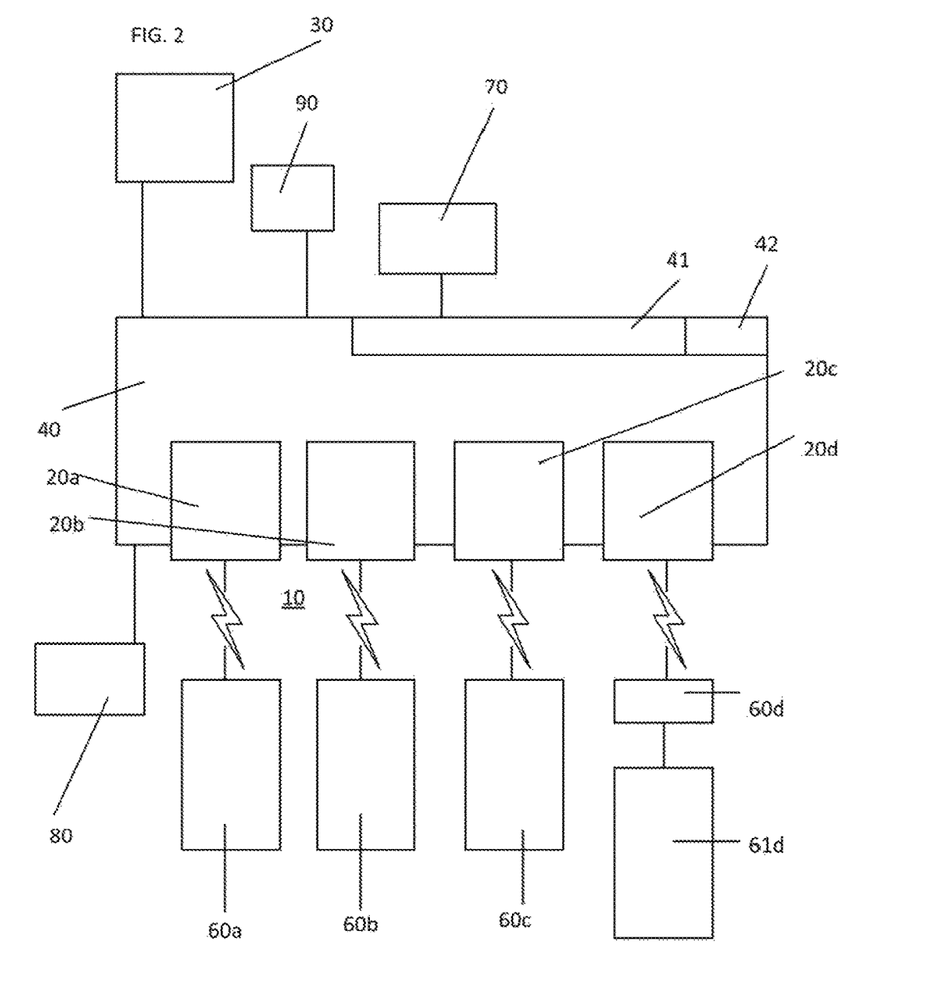
FIG. 2 is a block diagram of an example system to data from a plurality of data sources to a client computing device.

In one example, remote data may be heterogeneous. For example, they may provide differently formatted data, different types of data and/or have different access mechanisms. For example, one data source may be accessible via a representational state transfer (REST) type application programming interface (API) while another may be accessed via a simple object access protocol (SOAP) API. Other access mechanisms may also be utilized including transfer of data via files or a database connection such as via an open database connectivity (ODBC) link. FIG. 2 is a block diagram of an example system to serve data from a plurality of heterogeneous data sources to a client computing device.

In one example, the system 10 includes a plurality of plugins 20*a*-20*c*, each plugin 20*a*-20*c* being associated with, different remote data source 80*a*-60*c* and encoding computer program code to access the remote data source. In one example, each plugin 20*a*-20*c* encodes computer program code to access an API, link or other mechanism to communicate with its respective remote data source 60*a*-80*c*. For example, plugins 20*a* and 20*b* may communicate via different REST APIs with their respective data sources 60*a*, 60*b* while plugin 20*c* may communicate via a SOAP API with its data source 60*c*.

In one example, at least one processor 30 executes computer program code to provide an intermediate framework 40 to receive and execute the plurality of plugins, to access each remote data source and to obtain information on data available from each remote data source.

In one example, the intermediate framework 40 provides a unified interface 41 that is accessible to client computing devices 70 for accessing the remote data sources 60*a*-60*c*. In one example, the unified interface 41 includes a router 42 to receive a request from a client computing device 70 and to route the request to one of the plugins in dependence on the request. In one example the router 42 routes requests in dependence on a subject of the request.

In one example, the intermediate framework publishes the information obtained on data available from the remote data sources and maintains a link between the published information and the respective plugin 60*a*-60*c* from which it is available. For example, the link may be via a look-up table, encoded in a predetermined labelling format of the published information or some other way. In one example, the requests from client computing devices 70 are on the published information, the router cross-referencing the published information the request with the links to determine the appropriate plugin 20*a*-20*c*.

In one example, the intermediate framework 40 includes a data repository 80 of user interface elements, the interface including at least one processor to execute computer program code to access the data repository of user interface elements to output the retrieved data.

In one example, the user interface elements are selected from a set including a visual layout of a user interface to output the retrieved data and a visual representation to be used to output the retrieved data. In one example, a visual layout may be a workspace or a view. In one example, a workspace includes a number of views, the visible view being selectable via a control such as a tabbed display, button, drop-down box or radio box. In one example, a view is a layout of widgets and/or other user interface elements. In one example, a widget is a graphical display element that can be used to display retrieved data, for example in a graph, list or other format.

In one example, user interface elements are defined by a plugin 20 so as to be available for display of data retrieved from the plugin's respective data source 60. In one example, user interface elements are defined at the data source 60 and communicated to the intermediate framework 40 via the respective plugin 20. In one example, the intermediate framework 40 accessed the remote data source 60 via the respective plugin 20 and, upon determining a change in definition of user interface elements at the data source 60, updates the data repository 80.

In one example, the system includes a rights management system 90. In one example, the intermediate framework 40 includes at least one processor to execute computer program code to access the rights management system 90 to determine a response to a received request. For example, the rights management system may arbitrate security, authentication, auditing, logging and/or management of requests. In one example, the rights management system 90 provides common security layer to the remote data sources 60. In one example, security is based on a role based access control scheme.

In one example, the system includes a virtual data source adapter 60d to interface between a data source 61d and a further respective plugin 20d for the data source 61d. In one example, the virtual data source adapter 60d provides responses to requests from the plugin 20d on behalf of the data source 61d. In this way, data sources that cannot respond appropriately to requests from plugins at the intermediate framework 40 can have a virtual data source adapter installed locally or at some point between the plug in and the data source to act as an emulator and/or translator and provide functionality that the data source cannot.

In one example, the intermediate framework 40 is hosted by a server having a processor to execute computer program code, a memory to store the plugins which are accessible and executable by the processor and a network interface to connect to one or more networks and enable communications to client computing devices and remote data sources. In one example, the intermediate framework 40 is hosted by a number of servers forming a server farm.

It will be appreciated that the framework can provide access to data sources irrespective of where they are hosted. In one example, one or more of the data sources are physically remote from the intermediate framework. In one example, one or more of the data sources are hosted on the same computing system as the intermediate framework.

Figure 3:
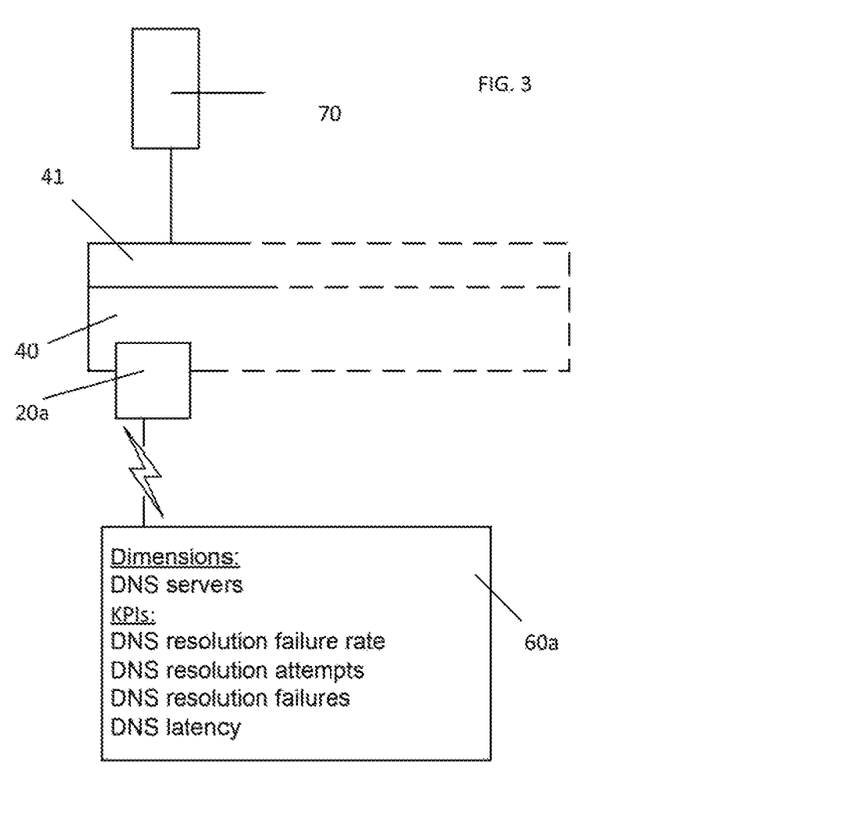
FIG. 3 is an illustration of example published information and its links to the respective data source via a plugin

FIG. 3 is an illustration of example published information and its links to the respective data source via a plugin.

In the illustrated example a first data source 60a includes data on a domain name server (DNS). The framework 40, via the plugin 20a for the first data source 60a accesses the remote data source and obtains information on data available. In one example the information may be a list of data and data types including data types such as raw data, processed data, statistical analysis of data, data measures (for example the period over which data is measured), data dimensions and key performance indicators (KPIs). In the illustrated example, data dimensions available are different DNS servers (so a request could be limited to a particular DNS server) or different user IDs, measures are the time range over which the KPI may be determined and KPIs available are DNS resolution failure rate, DNS resolution attempts, DNS resolution failures and DNS latency.

In one example, the obtained information is published. In one example, publication may be by making the information available via one or more API calls to the unified interface 41, the unified interface 41 providing a unified view of all information available via the plugins. For example, a client computing device 70 may request a list of all categories of available data via an API call (in a networking environment categories may include, for example. DNS, Firewall, TCP/IP and network authentication). In one example, the API may also provide one or more calls to enable the client computing device to obtain detail on measures, dimensions, KPIs and/or any other data types available for a particular category. The client computing device can then, via another API call, request data on one or more of the measures, dimensions, KPIs etc. which is retrieved via the plugin 20a and presented to the client computing device 70 by the unified interface 41.

Figure 4:
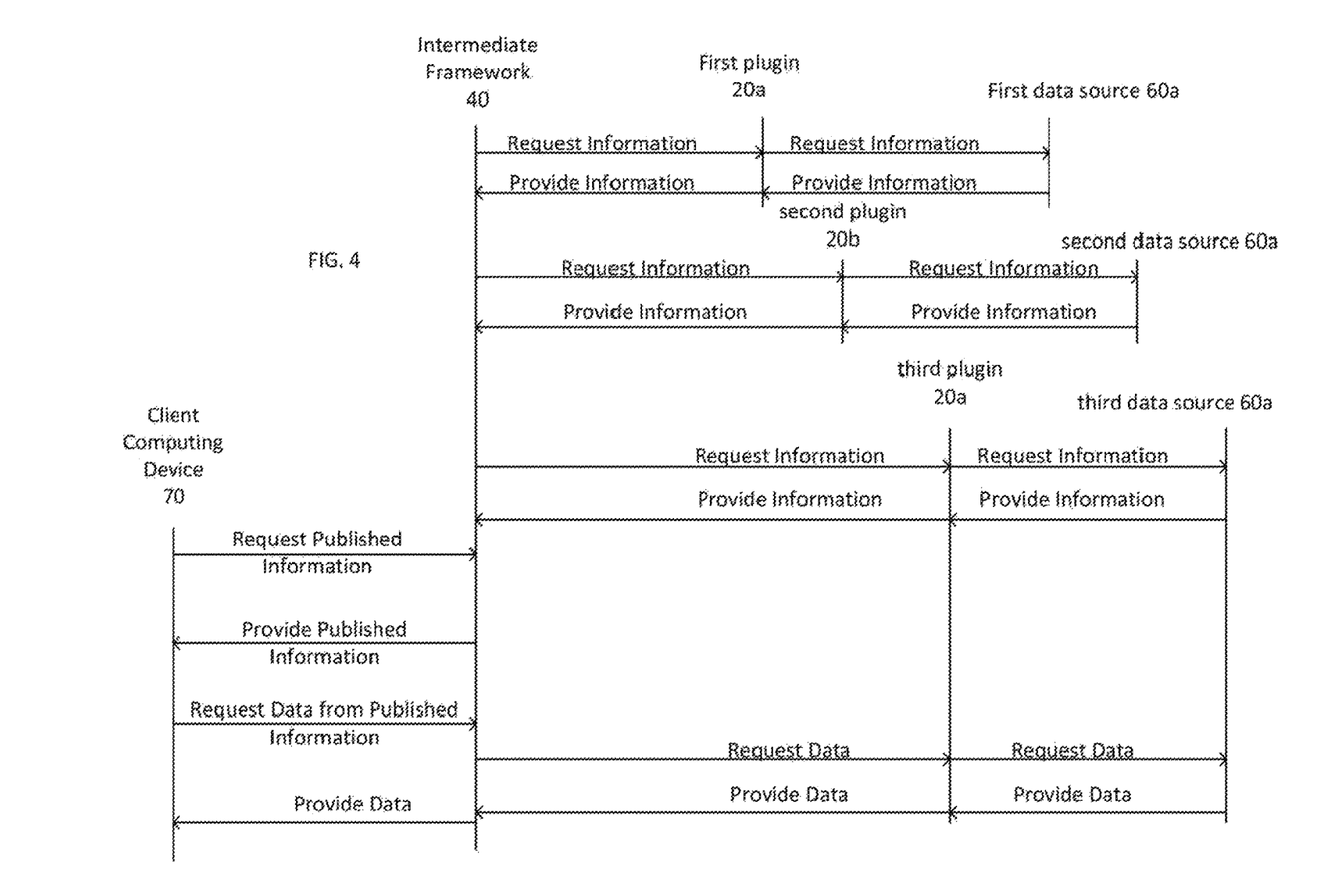
FIG. 4 is an illustration of n example data communication session based on the illustration of FIG. 2.

FIG. 4 is an illustration of an example data communication session based on the illustration of FIG. 2.

In the illustrated example, the intermediate framework 40 obtains information on data available from each data source 60a-60c using its respective plugin 20a-20c. A client computing device 70 subsequently requests the information available (such as via an API call as discussed above) which is returned by the intermediate framework 40. In one example, a user interface may be presented to a user via the client computing device including menus, drop down boxes or other user interface fields in which the user can select measures, dimensions, KPIs etc. to be accessed. Upon receiving a user request for information, the client computing device 10 requests (such as via an API call), the information from the intermediate framework 40. The intermediate framework 40 routes the request to the respective plugin (in this example plugin 20b) which communicates with its respective data source 60b. Data is returnFed from the data source 60b, via plugin 20b and the intermediate framework 40 to the client computing device.

In this way, the intermediate framework can provide access to multiple data sources in a manner that is transparent to the user and their client computing device. Changes to data sources such as types of data available views or widgets to be used to display data etc. can be pushed back to the framework and taken into account. Changes to the data sources (for example, removal of a data source or addition of a data source) can also be done by removal or addition of a respective plugin without needing further configuration at the framework or at the data source.

Figure 5:
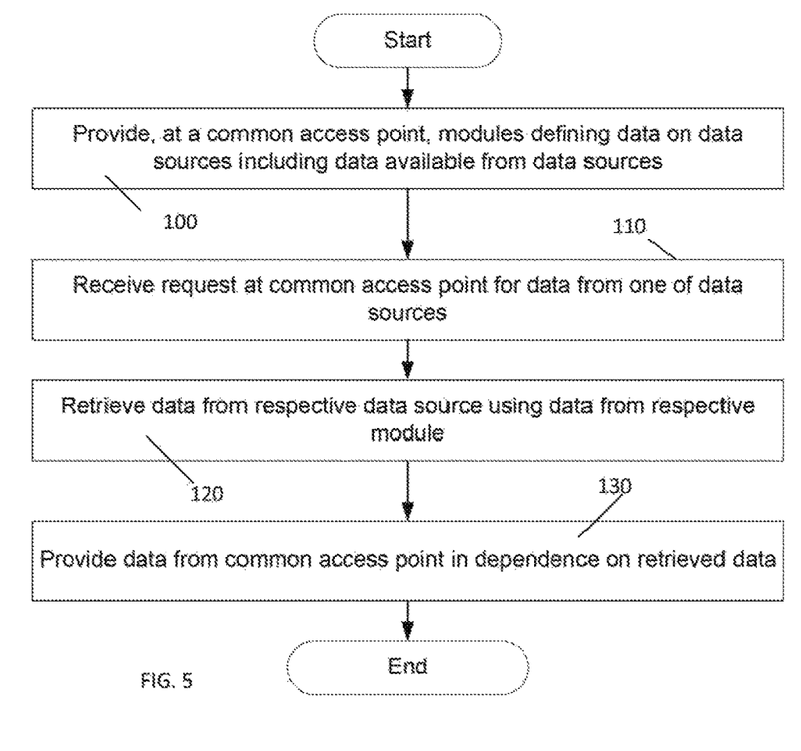
FIG. 5 is a flow diagram illustrating an example method of providing data from a plurality of data sources.

FIG. 5 is a flow diagram illustrating an example method of providing data from a plurality of data sources.

In one example, starting at step 100, a plurality of modules are provided at a common access point, each module defining data on a respective one of a plurality of data sources, the data including information on data available from the respective data source. At step 110, a request for data from one of the plurality of data sources is received at the common access point. At step 120, in response to the request for data from one of the plurality of data sources at the common access point, data is retrieved from the respective data source using the data on the data source from the respective module. At step 130 data is provided from the common access point in dependence on the retrieved data.

Figure 6:
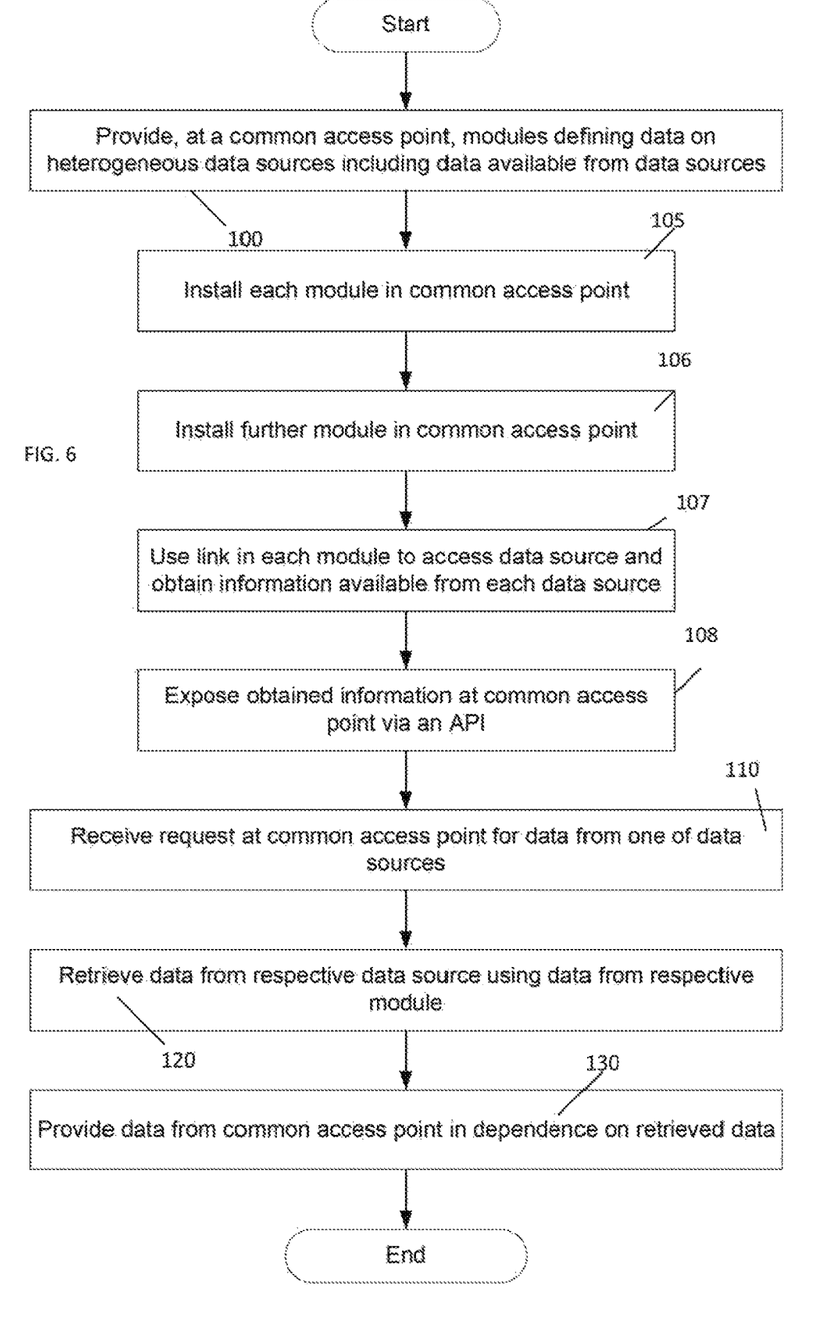
FIG. 6 is a flow diagram illustrating an example method of providing data from a plurality of data sources; and, FIG. 7 is a flow diagram of an example of a process which may be employed to control provision of data from data sources.

FIG. 6 is a flow diagram illustrating an example method of providing data from a plurality of data sources.

Starting at step 100, a plurality of modules are provided at a common access point, each module defining data on a respective one of a plurality of data sources, the data including information on data available from the respective data source. In one example, each module defines data on a heterogeneous data source. In one example, at step 105 a module is installed in the common access point for each of the plurality of data sources. In one example, at step 106 a further module is installed in the common access point to extend the data sources having data accessible via the common access point.

At step 107 a link in each module to its respective data, source is used to access the data source to obtain information on data available from each data source. At step 108, the information on data available from the data sources is exposed at the common access point via an application programming interface.

Continuing at step 110, a request for data from one of the plurality of data sources is received at the common access point. At step 120 response to the request for data from one of the plurality of data sources at the common access point, data is retrieved from the respective data source using the link from the respective module. At step 130 data is provided from the common access point in dependence on the retrieved data.

In one example, the data on the data source includes a representation definition. In one example, step 130 includes providing the retrieved data according to the representation definition.

Figure 7:
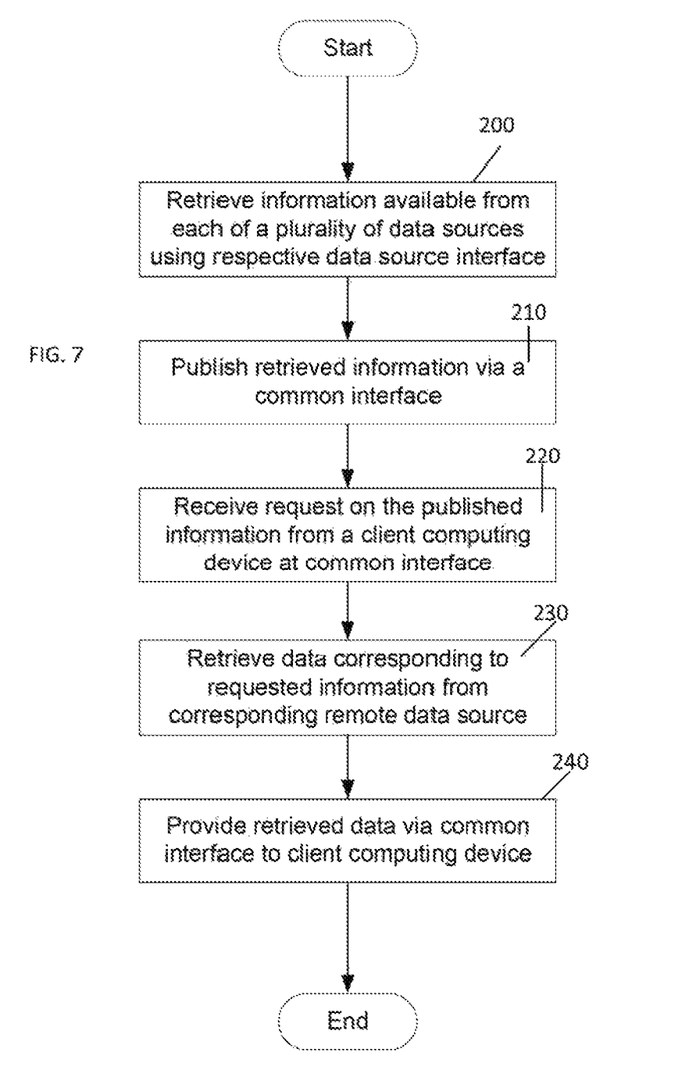

FIG. 7 diagram of an example of a process which may be employed to control provision of data from data sources.

Starting at block 200, information on data available from each of a plurality of remote data sources is retrieved using a respective data source interface for each remote data source. At block 210 the retrieved information on data available from each of the plurality of remote data sources is published via a common interface.

In one example, at block 220, a request on said information is received from a client computing device via the common interface. At block 230, in one example, data corresponding to the requested information is retrieved from the corresponding remote data source via its respective data source interface and at block 240 the retrieved data is provided via the common interface to the client computing device.

The functions and operations described with respect to, for example, the process which may be employed to control provision of data from data sources may be implemented as a computer-readable storage medium containing instructions executed by a processor and stored in a memory. Processor may represent generally any instruction execution system, such as a computer/processor based system or an ASIC (Application Specific Integrated Circuit), a Field Programmable Gate Array (FPGA), a computer, or other system that can fetch or obtain instructions or logic stored in memory and execute the instructions or logic contained therein. Memory represents generally any memory configured to store program instructions and other data.

Accordingly, various examples described herein were developed to provide methods, computer-readable media, and systems for providing data from data sources. One method for providing data from a plurality of data sources includes providing, at a common access point, a plurality of modules, each module defining data on a respective one of a plurality of data sources, the data including information on data available from the respective data source and, in response to a request for data from one of the plurality of data sources at the common access point, retrieving data from the respective data source nosing the data on the data source from the respective module and providing data frown the common access point in dependence on the retrieved data.

Examples described herein may enable a modular framework to be formed that provides unified access to a plurality of data sources. Modules can be added to or removed from the framework as needed to change the data sources that are accessible. Changes in the data sources themselves or the way their data is to be output can be propagated to client devices via the modules and a common interface provided by the modular framework.

Various modifications may be made to the disclosed examples and implementations without departing from their scope. Therefore the illustrations and examples herein should be construed in an illustrative, and not a restrictive, sense.

What is claimed is:

1. A method of providing data from a plurality of data sources comprising:
    providing, at a unified interface, a plurality of plugin modules, each plugin module publishing in a predetermined labelling format at a common access point data on each respective one of a plurality of data sources, wherein published data for the plurality of plugin modules includes information on data available from each respective data source;
    in response to a selection by a user of one of the plurality of data sources at the unified interface, routing a request to a particular plugin module in the plurality of plugin modules that is associated with the selection by the user;
    updating a look-up table that links the published data and the particular plugin module;
    determining a location of the data from the updated look-up table;
    receiving the data from the respective data source at the location determined from the look-up table via the particular plugin module; and
    providing the retrieved data to the unified interface.

2. The method of claim 1, wherein each plugin module defines data on a heterogeneous data source, the method further comprising installing a plugin module in the unified interface for each of the plurality of data sources.

3. The method of claim 2, further comprising installing a further plugin module in the unified interface to extend the data sources having data accessible via the common access point.

4. The method of claim 1, further comprising publishing the information on data available from the data sources in the predetermined labelling format at the common access point via an application programming interface.

5. The method of claim 1, wherein each plugin module includes a link to its respective data source, the method further comprising accessing the data source via the link to obtain the information on data available from the data source.

6. The method of claim 5, the method further comprising, for each plugin module performing the step of accessing its link to obtain the information on data available from the respective data source to be published in the predetermined labelling format at the common access point.

7. The method of claim 1, wherein the data on a data source includes a representation definition, the step of providing data from the unified interface further comprising providing the retrieved data according to the representation definition.

8. The method of claim 1, wherein the routing is based at least in part on a subject of the request.

9. A system to serve data from a plurality of data sources to a client computing device, the system comprising:
a plurality of plugins, each plugin being associated with one of the plurality of data sources and encoding computer program code to access the plurality of data sources;
at least one processor to execute computer program code to provide an intermediate framework to receive and execute the plurality of plugins, to access each of the plurality of data sources, and to publish information on data available from the plurality of data sources; and
a unified interface to:
  receive a request,
  in response to a selection by a user from a menu or drop down box of one of the plurality of data sources at the unified interface, route the request to a particular plugin module in the plurality of plugins,
  update a look-up table that links the published information and the particular plugin module,
  determining a location of the data from the updated look-up table,
  receive the data corresponding to the request by accessing a data source at the location determined from the look-up table and corresponding to the published information using the particular plugin, and
  provide in a predetermined labelling format at a common access point information on the data available from the plurality of data sources.

10. The system of claim 9, wherein the intermediate framework includes a data repository of user interface elements, the interface including at least one processor to execute computer program code to access the data repository of user interface elements to output the retrieved data.

11. The system of claim 10, wherein the user interface elements are selected from a set including a visual layout of the unified interface to output the retrieved data.

12. The system of claim 10, further comprising a rights management system, wherein the intermediate framework includes at least one processor to execute computer program code to access the rights management system, and wherein the rights management system is configured to determine a response to the request.

13. The system of claim 10, further comprising a virtual data source adapter to interface between a data source and the respective plugin for the data source, the virtual data source adapter providing responses to requests from the plugin on behalf of a data source.

14. The system of claim 9, wherein the unified interface includes a router to receive the request from a client computing device.

15. The system of claim 14, wherein the intermediate framework includes at least one processor to execute computer program code to publish the obtained information on data available from the plurality of data sources in the predetermined labelling format at the common access point and to maintain a link between the published information and a respective plugin from which it is available.

16. A non-transitory computer-readable storage medium containing instructions to control provision of data from data sources, the instructions when executed by a processor causing the processor to:
receive information on data available from a plurality of remote data sources using a particular data source interface for the plurality of remote data sources;
publish the information on data available from the plurality of remote data sources in a predetermined labelling format at a common access point via a unified interface;
receive a request for the information from a client computing device via the unified interface;
in response to a selection by a user from a menu or drop down box of one of the plurality of data sources at the unified interface, route the request to a plugin that is associated with the selection by the user;
update a look-up table that links published information and the plugin module;
determine a location of the data from the updated look-up table;
receive the data corresponding to the information at the location determined from the look-up table via its particular data source interface; and
provide the data via the unified interface to the client computing device.

17. The non-transitory computer-readable storage medium of claim 16, wherein the instructions further cause the processor to install a plugin module in the unified interface for each of the plurality of remote data sources.

18. The non-transitory computer-readable storage medium of claim 17, wherein the instructions further cause the processor to install a further plugin module in the unified interface to extend the remote data sources having data accessible via the common access point.

19. The non-transitory computer-readable storage medium of claim 16, wherein the instructions further cause the processor to provide the published information in the predetermined labelling format at the common access point via an application programming interface.

20. The non-transitory computer-readable storage medium of claim 16, wherein each plugin module includes a link to its respective data source, and the wherein the instructions further cause the processor to access the remote data source via the link to obtain the information on data available from the remote data source.

21. The non-transitory computer-readable storage medium of claim 20, wherein the instructions further cause the processor, for each plugin module to obtain the information on data available from the respective remote data source to be published at the common access point.

* * * * *